Sept. 26, 1933.    D. L. YOUNG    1,928,277
WINDSHIELD WARMING DEVICE
Filed March 7, 1931    2 Sheets-Sheet 1
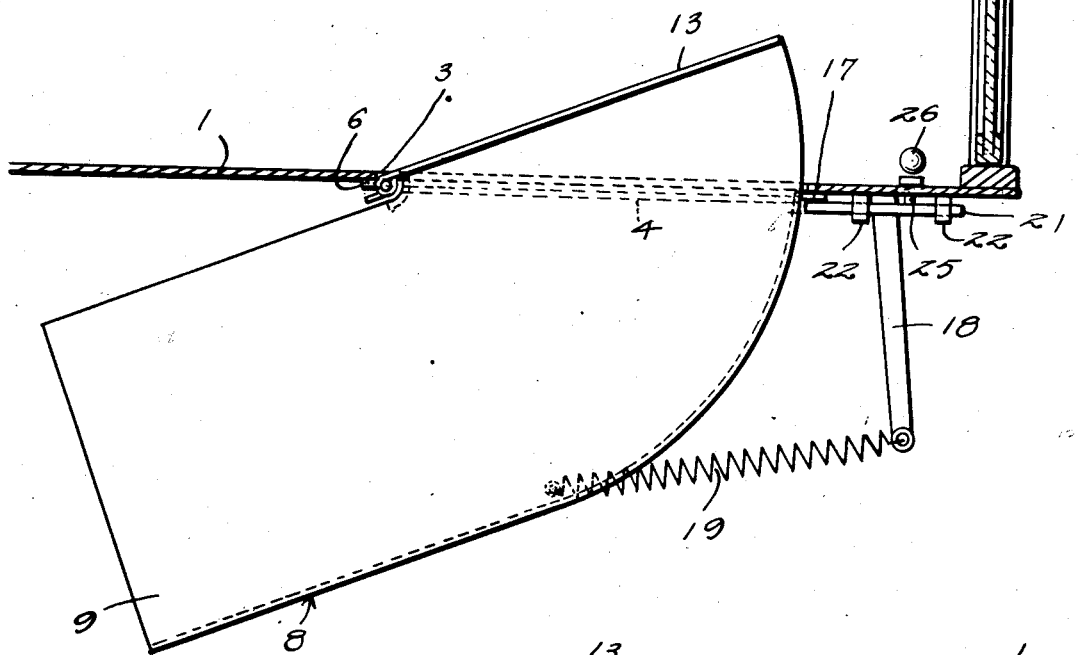
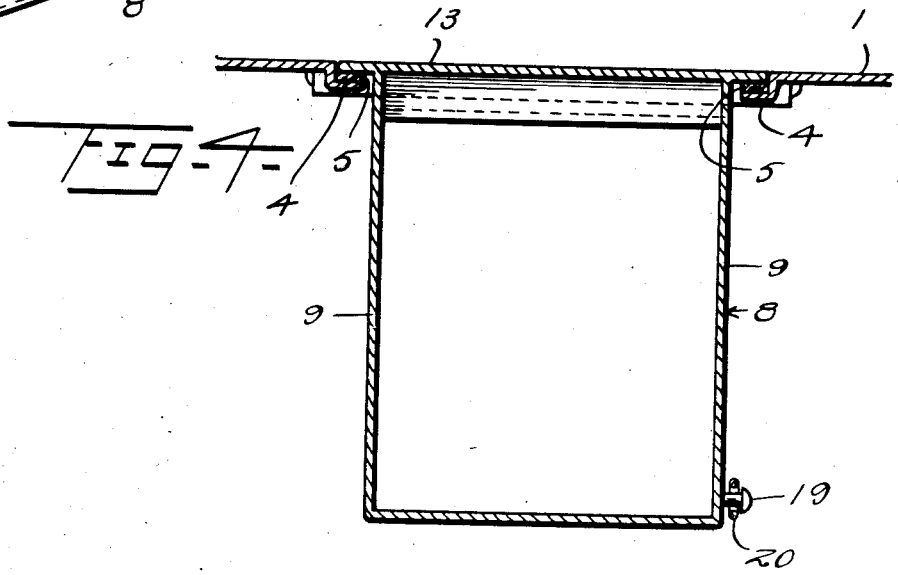
Inventor
D. L. Young
By Watson E. Coleman
Attorney Sept. 26, 1933.                 D. L. YOUNG                 1,928,277
                        WINDSHIELD WARMING DEVICE
                          Filed March 7, 1931          2 Sheets-Sheet 2
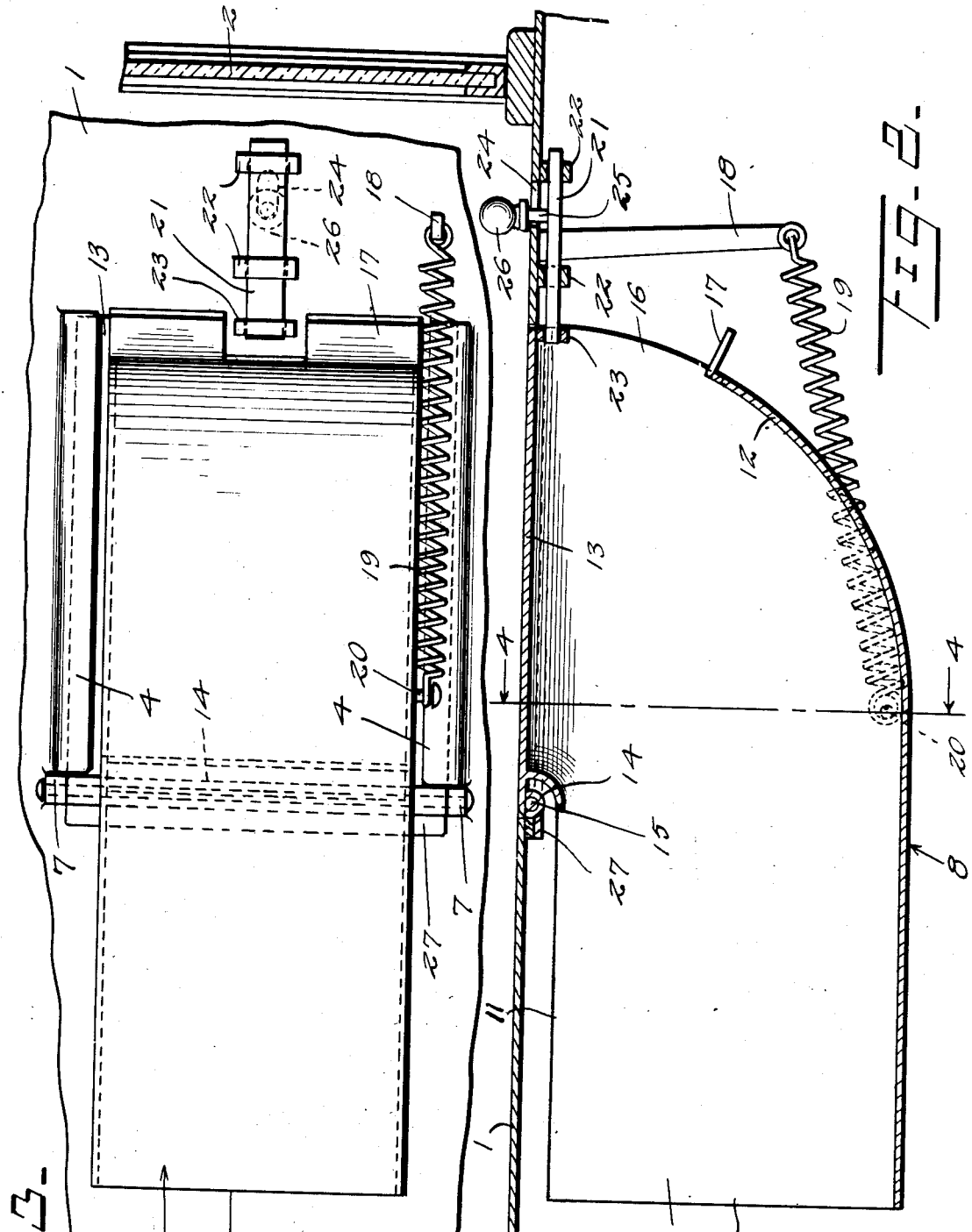
Inventor
D. L. Young
By Watson E. Coleman
         Attorney Patented Sept. 26, 1933

1,928,277

UNITED STATES PATENT OFFICE 1,928,277

WINDSHIELD WARMING DEVICE

Delmar L. Young, Salina, Kans.

Application March 7, 1931. Serial No. 520,894

8 Claims. (Cl. 20—40.5)

This invention relates to improvements in devices for preventing the formation of frost upon the windshield of a motor vehicle and pertains particularly to a device designed to discharge hot air against the windshield for effecting this result.

The primary object of the present invention is to provide a warm air collecting device oscillatably mounted beneath the cowl of the hood portion of a motor vehicle, which when oscillated to on' position will raise a portion of the cowl and extend itself through an opening covered by the said portion to discharge against the outer face of the adjacent windshield the warm air driven rearwardly thereinto by the motor vehicle fan.

Another object of the invention is to provide a windshield warmer which may be made a permanent part of the motor vehicle and which is of such a character that when it is not in use it will be hidden from view.

A still further object of the invention is to provide a windshield warmer which will be inconspicuous when in use, it being so built into the motor vehicle hood structure as to appear only as a cowl ventilator.

Other objects and advantages of the present invention will become apparent as the description of the same proceeds and the invention will be best understood from a consideration of the following detailed description taken in connection with the accompanying drawings forming a part of the present invention with the understanding, however, that the invention is not confined to any strict conformity with the showing of the drawings but may be changed or modified so long as such changes or modifications mark no material departure from the salient features of the invention as expressed in the appended claims.

In the drawings:—

Figure 1 is a view in vertical longitudinal section through the rear or cowl portion of a motor vehicle engine hood, and through a portion of the adjacent windshield, showing the device embodying the present invention associated therewith and in operative position.

Figure 2 is a vertical longitudinal sectional view through the device and the adjacent portion of the hood cowl, showing the device in closed or inoperative position.

Figure 3 is a bottom plan view of the device.

Figure 4 is a vertical transverse sectional view taken on the line 4—4 of Figure 2.

Referring now, more particularly to the drawings in detail wherein like numerals of reference indicate corresponding parts throughout the several views, the numeral 1 indicates generally the cowl portion of the motor vehicle engine hood with the top of which the lower part of the motor vehicle windshield 2 engages in the usual manner.

The cowl is provided with an opening 3, each side edge of which has extended inwardly therefrom the flange 4 which is in a lower plane than the body of the cowl as shown in Figure 4 and which has mounted thereon a gasket 5.

The under face of the cowl has disposed thereacross along the forward edge of the opening 3, the gasket material 6 with which a portion of the structure, hereinafter to be described, contacts when the device is not in use and there is secured at each side of the opening 3 in alignment with the forward edge thereof, and upon the under face of the cowl, the apertured bearing ears 7.

The warm air collecting portion of the present invention is indicated generally by the numeral 8 and as shown, it consists of the elongated hollow body 9 which is open at one end, as indicated at 10 and which has the top open as indicated at 11. The opposite end of this body has the lower wall rounded as indicated at 12, the body at the end opposite the open end 10 being right-angularly turned and closed by the plate 13 which is of a size to snugly fit in the opening 3. The body 8 is of less width than the opening 3 so that the right-angularly turned rear end thereof may swing upwardly through the opening in the manner about to be described.

The forward edge of the plate 13 is provided with the hinge sleeve 14 which positions between the ears 7 and has extended therethrough the pin 15 which passes through the ears as shown in Figure 3, so the body 8 will be oscillatably held in position.

The curved portion 12 of the bottom of the air collecting device 8 terminates short of the plate 13 which closes the angularly directed end of the body so that there is thus formed an opening 16 at the rear of the body through which air, driven rearwardly by the motor vehicle fan and entering at the open end 10, may pass. The edge of the wall 12 has the rearwardly projecting flange 17 formed integral therewith which, when the body 8 is oscillated to the position shown in Figure 1 so as to lift the plate 13 and swing the opening 16 out to a position over the cowl 1 and exteriorly of the hood, will limit the movement of the body.

Rearwardly of the body 8 there is mounted upon the under face of the cowl, the downwardly extending arm 18, the lower end of which is apertured to facilitate connection therewith of one end of a spring 19, the other end of which is attached to the side of the body 8, as indicated at 20. This spring 19 is held under tension when the body is in inoperative position, as shown in Figure 2, and in order to maintain the body in this position there is provided a latch bolt 21 which is slidably supported in the guide ears 22 mounted upon the under face of the cowl.

This bolt 21 when projected forwardly, when the body 8 is in inoperative position, or when the plate 13 is closing the opening 3, engages in an apertured ear 23 carried by the plate 13 and projecting inwardly therefrom, as shown in Figure 2. The portion of the cowl overlying the bolt 21 is provided with a slot 24 through which there extends upwardly the pin 25 carried by the bolt and carrying at its upper end, the knob 26 by means of which the reciprocation of the bolt may be effected.

The flange 17 may be provided intermediate its ends with a suitable recess to permit it to engage the under face of the cowl 1, the recess therein permitting it to pass the bolt 21.

From the foregoing description it will be readily seen that when the device is not in use the main portion of the body 8 thereof will position beneath the cowl substantially parallel with the under surface thereof and the plate 13 will completely close the opening 3. The device will be held in this position by the latch 21 in the manner illustrated in Figure 2. As previously stated, the spring will be under tension. In order to place the device in operation it is only necessary to retract the bolt 21 through the medium of the knob 26 and the spring will then act to oscillate the body 8 so as to raise the plate 13 and thus uncover the opening which, as will be seen, upon reference to Figure 1, will be directed toward the windshield immediately in the rear thereof. The sleeve 14 has formed integral therewith the flange 27 which, when the device is in inoperative position bears against the gasket 6 and thus prevents the passage of air through the opening 3 along this edge.

From the foregoing description it will be readily appreciated that the present device may be easily and economically applied to machines and it will be inconspicuous when in use and when not in use will be entirely hidden from view. Also, when it is placed into use it will operate efficiently to prevent the formation of frost upon the windshield.

Having thus described my invention, what I claim is:—

1. The combination with a motor vehicle engine hood having an opening in the cowl thereof, of an elongated hollow body having one end turned to form a right angle therewith, a plate member closing the turned end of the body and adapted to close said opening, said body having an opening through the turned end in close proximity to said plate and further having its other end open, and means for oscillatably mounting the body upon the cowl, whereby the plate thereof may act to close said opening, and the body may be shifted from a horizontal position beneath the cowl to an angular position with respect thereto to raise the open rear end thereof to a position above the top of the cowl.

2. The combination with a motor vehicle engine hood having an opening through the cowl portion thereof adjacent the vehicle windshield, of an elongated hollow body designed to be positioned longitudinally of and beneath the cowl and having its rear end turned upwardly toward the said opening, a plate member covering the said turned end of the body and adapted to close said opening, hinge means between said plate and the forward edge of the opening whereby a portion of the turned end of the body may be moved upwardly through the opening upon the oscillation of the body, said body having its forward end open and having an opening through the rear end adjacent the plate, means for limiting the projection of the rear end of the body through said opening and resilient means normally urging the oscillation of the body in a direction to raise the plate and to uncover the opening in the rear end thereof.

3. The combination with a motor vehicle engine hood having an opening through the cowl portion thereof adjacent the vehicle windshield, of an elongated hollow body designed to be positioned longitudinally of and beneath the cowl and having its rear end turned upwardly toward the said opening, a plate member covering the said turned end of the body and adapted to close said opening, hinge means between said plate and the forward edge of the opening whereby a portion of the turned end of the body may be moved upwardly through the opening upon the oscillation of the body, said body having its forward end open and having an opening through the rear end adjacent the plate, means for limiting the projection of the rear end of the body through said opening, resilient means normally urging the oscillation of the body in a direction to raise the plate and to uncover the opening in the rear end thereof, a flange formed along each side edge of said opening, said plate being of greater width than the body, and overlying said flange when in closed position, and a gasket interposed between the plate and the flange underlying each side thereof.

4. A motor vehicle windshield warming device comprising the combination with the hood of a motor vehicle, having an opening in the cowl portion thereof, of a body oscillatably attached to the cowl and normally arranged beneath the surface thereof, said body being hollow and having oppositely disposed openings and designed when oscillated to one position to shift one of said openings from a position beneath the cowl to a position above the same whereby to direct air forced into the other open end by the vehicle fan, against the face of the adjacent windshield, a portion of said body operating to close the cowl opening when the body is in inoperative position.

5. A motor vehicle windshield warmer comprising, in combination with the motor vehicle engine hood having an opening in the cowl portion thereof, an elongated hollow body having one end turned right-angularly, a plate covering the turned end, hinge means between one edge of the plate and the forward edge of said opening, said plate being adapted to close said opening, the other end of the body being opened and arranged to receive air driven rearwardly under the hood by the engine fan, the other end of the body having an opening therethrough adjacent said plate, latch means designed to maintain the plate in position in the opening of the cowl, and a spring element connected with the body to oscillate the same upon the release of said latch means to lift the plate and to raise the adjacent body opening to a position above the cowl.

6. A motor vehicle windshield warmer comprising, in combination with the motor vehicle engine hood having an opening in the cowl portion thereof, an elongated hollow body having one end turned right-angularly, a plate covering the turned end, hinge means between one edge of the plate and the forward edge of said opening, said plate being adapted to close said opening, the other end of the body being opened and arranged to receive air driven rearwardly under the hood by the engine fan, the other end of the body having an opening therethrough adjacent said plate, latch means designed to maintain the plate in position in the opening of the cowl, a spring element connected with the body to oscillate the same upon the release of said latch means to lift the plate and to raise the adjacent body opening to a position above the cowl, and a movement limiting flange forming a part of the body adjacent the last mentioned opening for engaging the cowl when the body is oscillated.

7. In a motor vehicle windshield warmer, an engine hood having an opening therethrough disposed adjacent the vehicle windshield, a cover for said opening and pivoted to open toward the windshield, and a tubular body attached at one end to the under side of said cover and having the said end open and further having the opposite end open, said tubular body having the cover attached end swung through the said opening when the cover is moved to open position to direct warm air from the under side of the hood through the first mentioned open end toward the adjacent windshield.

8. In a motor vehicle windshield warmer, an engine hood having an opening therethrough disposed adjacent the vehicle windshield, a cover for said opening having hinged connection with the hood body to open toward the windshield, an elongated tubular body open at each end and attached adjacent one end to the under side of the cover, the attached open end of the tubular body being drawn through the opening when the cover is shifted to open position, means for normally latching the cover in closed position, and resilient means operating upon the release of said latching means to raise the cover to opened position.

DELMAR L. YOUNG.